United States Patent
Cranshaw et al.

(10) Patent No.: US 11,935,082 B2
(45) Date of Patent: Mar. 19, 2024

(54) DISCOVERING NEIGHBORHOOD CLUSTERS AND USES THEREFOR

(71) Applicant: Carnegie Mellon University, Pittsburgh, PA (US)

(72) Inventors: Justin Cranshaw, Pittsburgh, PA (US); Raz Schwartz, New York, NY (US); Jason I. Hong, Pittsburgh, PA (US); Norman Sadeh-Koniecpol, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 17/572,252

(22) Filed: Jan. 10, 2022

(65) Prior Publication Data

US 2022/0129930 A1    Apr. 28, 2022

Related U.S. Application Data

(60) Division of application No. 16/927,671, filed on Jul. 13, 2020, now Pat. No. 11,222,349, which is a continuation of application No. 15/845,203, filed on Dec. 18, 2017, now Pat. No. 10,713,672, which is a division of application No. 14/015,506, filed on Aug. 30, 2013, now Pat. No. 9,846,887.

(60) Provisional application No. 61/743,263, filed on Aug. 30, 2012.

(51) Int. Cl.
G06Q 30/02     (2023.01)
G06Q 30/0204   (2023.01)

(52) U.S. Cl.
CPC ................ *G06Q 30/0205* (2013.01)

(58) Field of Classification Search
CPC .................................................. G06Q 30/02
See application file for complete search history.

(56) References Cited

U.S. PATENT DOCUMENTS 7,774,227 B2    8/2010    Srivastava
7,797,180 B2    9/2010    Srivastava
8,239,130 B1 *  8/2012    Upstill ............... G01C 21/3679
                                                      701/410

(Continued)

FOREIGN PATENT DOCUMENTS

WO    WO-2011116298 A2 *  9/2011    ............. G06Q 30/02

OTHER PUBLICATIONS

Zahava D. Doering, Audrey E. Kindlon, Adam Bickford, The Power of Maps: A Study of an exhibition at Cooper-Hewitt National Museum of Design, Institutional Studies Smithsonian Institution, Sep. 1993. (Year: 1993).*

(Continued)

*Primary Examiner* — Kurtis Gills
(74) *Attorney, Agent, or Firm* — KDW Firm PLLC

(57) ABSTRACT

Computer-based systems and methods for discovering neighborhood clusters in a geographic region, where the clusters have a mix of venues and are determined based on venue check-in data. The mix of venues for the clusters may be based on the social similarity between pairs of venues; or emblematic of certain neighborhood typologies; or emblematic of temporal check-in pattern types; or combinations thereof. The neighborhood clusters that are so discovered through venue-check in data could be used for many commercial and civic purposes.

25 Claims, 4 Drawing Sheets

(56) References Cited

U.S. PATENT DOCUMENTS

| | | | |
|---|---|---|---|
| 8,364,171 | B2 | 1/2013 | Busch |
| 8,620,726 | B2 | 12/2013 | Nielsen et al. |
| 9,009,132 | B2 | 4/2015 | Camper |
| 9,031,978 | B1 | 5/2015 | Beresniewicz et al. |
| 10,318,110 | B2 | 6/2019 | Naaman et al. |
| 10,504,126 | B2* | 12/2019 | Kulkarni ............ H04M 15/8011 |
| 2008/0129487 | A1* | 6/2008 | Crucs ...................... G06Q 10/06 340/10.42 |
| 2009/0005987 | A1* | 1/2009 | Vengroff ................. G06Q 30/02 705/7.34 |
| 2012/0053987 | A1* | 3/2012 | Satyavolu ........... H04M 15/851 705/7.29 |
| 2012/0066065 | A1* | 3/2012 | Switzer .............. G06Q 30/0255 705/1.1 |
| 2012/0095863 | A1* | 4/2012 | Schiff ................ G06Q 30/0282 705/26.7 |
| 2012/0290950 | A1* | 11/2012 | Rapaport ................. H04L 51/52 715/753 |
| 2013/0246300 | A1* | 9/2013 | Fischer .............. G06Q 30/0206 705/347 |
| 2013/0310078 | A1* | 11/2013 | Raman .................... H04W 4/21 455/456.3 |
| 2013/0337830 | A1* | 12/2013 | Haro ..................... H04W 4/021 455/456.1 |
| 2016/0161274 | A1* | 6/2016 | Mach ..................... G06F 16/70 701/426 |

OTHER PUBLICATIONS

Ghosh et al., "From Deformations to Parts: Motion-based Segmentation of 3D Objects", NIPS'12 Proceedings of the 25th International Conference on Neural Information Processing Systems—vol. 2, Dec. 2012, 9 pages.

Blei, David M. and Peter I. Frazier. "Distance Dependent Chinese Restaurant Processes." Journal of Machine Learning Research 12 (2011) pp. 2383-2410.

Cheng, Zhiyuan, James Caverlee, Kyumin Lee. "Exploring Millions of Footprints in Location Sharing Services." Association for the Advancement of Artificial Intelligence.

Ghosh, Soumya, Andrei B. Ungureanu, Erik B. Sudderth, and David Blei. "Spatial distance dependent Chinese restaurant processes for image segmentation." NIPS (2011), pp. 1476-1484.

Cranshaw, Justin, Raz Schwartz, Jason I. Hong and Norman Sadeh. "The Livehoods Project: Utilizing Social Media to Understand the Dynamics of a City." Proceedings of the Sixth International AAAI Conference on Weblogs and Social Media. pp. 58-65.

Silva, Thiago H., Pedro Olmo S. Vaz de Melo, Jussara M. Almeida and Antonio A.F. Loureiro. "Social Media as a Source of Sensing to Study City Dynamics and Urban Social Behavior: Approaches, Models, and Opportunities." MUSE/MSM 2012, LNAI 8329, pp. 63-87, 2013.

Ghosh, Soumya, Erik B. Sudderth, Matthew Loper and Michael J. Black. "From Deformations to Parts: Motion-based Segmentation of 3D Objects." 9 pages.

Cheng et al., "Exploring Millions of Footprints in Location Sharing Services", Association for the Advancement of Artificial Intelligence, 2011, 8 pages.

Cranshaw et al., "The Livehoods Project: Utilizing Social Media to Understand the Dynamics of a City", Proceedings of the Sixth International AAAI Conference on Weblogs and Social Media, Association for the Advancement of Artificial Intelligence, 2012, pp. 58-65.

Silva et al., "Social Media as a Source of Sensing to StudyCity Dynamics and Urban Social Behavior: Approaches, Models, and Opportunities", MUSE/MSM 2012, LNAI 8329, 2013, pp. 63-87.

Ghosh et al., "Spatial distance dependent Chinese restaurant processes for image segmentation", NIPS'11 Proceedings of the 24th International Conference on Neural Information Processing Systems, Dec. 2011, 9 pages.

* cited by examiner

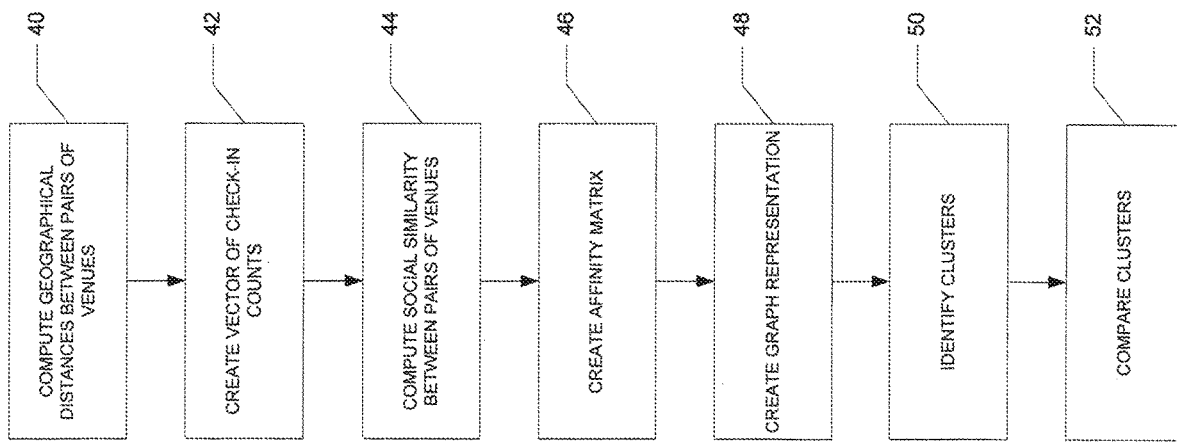

| Topic 3<br>Rail Travel | Topic 4<br>Medical | Topic 6<br>Air Travel | Topic 8<br>Shopping | Topic 13<br>University | Topic 12<br>Coastal | Topic 14<br>Outdoors | Topic 15<br>Korea Town | Topic 19<br>China Town | Topic 20<br>Sporting Events |
|---|---|---|---|---|---|---|---|---|---|
| Train | Hospital | Airport Gate | Clothing Store | College Academic Bldng. | Apartment / Condo | Park | Korean Restnt. | Chinese Restnt. | Baseball Stadium |
| Train Station | Doctor's Office | Plane | Office | College Residence Hall | Harbor / Marina | Biking Trail | Karaoke Bar | Mexican Restnt. | Bar |
| Office | Medical School | Airport Terminal | Boutique | University | Boat or Ferry | Great Outdoors | Asian Restnt. | Vietnamese Restnt. | Entertainment |
| Train Platform | Medical Center | Airport | Women's Store | College Admin. Bldng. | Biking | Music Venue | Bar | Bakery | Sports Bar |
| Coffee Shop | Coffee Shop | Travel | Shoe Store | College Library | Bus Station | Entertainment | Coffee Shop | Entertainment | Beer Garden |
| Bar | Mexican Restnt. | Airport Lounge | American Restnt. | Coffee Shop | Beach | Scenic Lookout | Cafe | Dim Sum Restnt. | Baseball Field |
| American Restnt. | American Restnt. | Coffee Shop | Cosmetics Shop | College Arts Bldng. | Park | Zoo | Mexican Restnt. | Grocery Store | Parking |
| Bakery | Park | Parking | Coffee Shop | College / University | Bus Line | Harbor / Marina | Bakery | Park | American Restnt. |
| Pizza Place | Emergency Room | American Restnt. | Bar | Student Center | Great Outdoors | Lake | Church | Pizza | Strip Club |
| Bus Line | Sandwich Place | Bus Line | Italian Restnt. | College Science Bldng. | Office | Sculpture Garden | Japanese Restnt. | Tea Room | Music Venue |
| Deli / Bodega | Office | Pizza Place | Art Gallery | College Quad | Scenic Lookout | American Restnt. | Office | Gift Shop | Apartment / Condo |
| Light Rail | Fast Food Restnt. | Bar | Salon / Barbershop | Apartment / Condo | Gym | Art Museum | Grocery Store | Building | Clothing Store |
| Biking | Gas Station / Garage | Fast Food Restnt. | Hotel | Fraternity House | American Restnt. | Cafe | Chinese Restnt. | Asian Restaurant | Sandwich Place |
| Entertainment | Bus Line | Rental Car Location | Men's Store | Bar | Event Space | Apartment / Condo | Hotel | Music Venue | Sporting Goods Shop |
| Bus Station | School | Mexican Restnt. | Sandwich Place | College Cafeteria | Entertainment | Monument | Bibimbap | Church | Nightlife |

FIG. 4

Ten (10) topics discovered by posterior inference on the model are highlighted in the above table. The 15 most probable categories from each topic are shown. Topic names are supplied by the inventors to capture what they felt each collection of venues represents.

DISCOVERING NEIGHBORHOOD CLUSTERS AND USES THEREFOR

PRIORITY CLAIM

The present application is a divisional of U.S. patent application Ser. No. 16/927,671, filed on Jul. 13, 2020, which is a continuation of U.S. patent application Ser. No. 15/845,203, filed Dec. 18, 2017, which is a divisional of U.S. patent application Ser. No. 14/015,506, filed Aug. 30, 2013, which claims priority to U.S. provisional application Ser. No. 61/743,263, entitled "Utilizing social media to understand the dynamics of a city," filed Aug. 30, 2012. The entire contents of these applications are incorporated herein by reference.

GOVERNMENT INTEREST

This invention was made with U.S. government support under CNS0627513, CNS0905562 and CNS1012763 awarded by the National Science Foundation (NFS). The U.S. government has certain rights in the invention.

BACKGROUND

A city, in all its chaos and complexity, is a place teeming with structure and patterns. From the diurnal cycles of the city's populace, to the way certain types of businesses sometimes cluster together like jewelry shops in the diamond district or restaurant supply stores in Manhattan's Bowery, examples of structure in cities abound. Understanding and assimilating these urban patterns is not only an essential part of life and survival in a big city, it is perhaps the critical factor that drives success in urban planning, real-estate and business development, marketing, recommendations, public health, transportation, and other endeavors that aim to make sense of the city.

Traditionally online maps and other location-based services have been useful to help people locate points of interest and navigate from one point to another.

SUMMARY

In one general aspect, the present invention is directed to computer-based systems and methods for discovering neighborhood clusters in a city or other geographic region, where the clusters have a mix of venues and are determined based on venue check-in data. The venue check-in data could be collected from venue check-in applications or other data sources that indicate either when a particular person was at a particular venue, such as credit or debit card point-of-sale data; or when a person indicates a preference for a particular venue (such as a venue rating system); or when a person adds an annotation to a particular venue (such as a venue review system); or other data indicative of when a person is at a particular venue (e.g., sensor data or other presence data). In various embodiments, the mix of venues for the clusters may be, for example, based on the social similarity between pairs of venues; or emblematic of certain neighborhood typologies; or emblematic of temporal check-in pattern types; or combinations thereof. A pairwise venue similarity matrix, whose elements are scores indicative of the social similarity between pairs of venues, may be used to identify clusters based on social similarity. The social similarity may also be based on the geographical distance between the pair of venues; for example, if the venues are more than a threshold distance apart, or they are not one of each other #s m closest neighbors, they can be assumed to have no social similarity. Otherwise, their social similarity could be computed using, for example, cosine or Jaccard similarities, or any other suitable similarity measure derived, for example, from a vector representation of the venues.

Data about the category types of the venues may be used to discover mixes of venues that are emblematic of a neighborhood type. In various embodiments, a probabilistic model is assumed about the structure of neighborhoods, and inference is used to compute a probabilistic distribution of venues for each cluster such that the mix of venues for each cluster is emblematic of a neighborhood type. In particular, Gibbs sampling could be used, although other statistical sampling techniques for inference could also be used. Similarly, time stamps for the venue check-ins may be used to discover clusters that are emblematic of predetermined check-in temporal pattern types. Again, a probabilistic model is assumed for how the temporal check-in data are generated, and inference (e.g., Gibbs sampling) can be used to compute a probabilistic distribution of venues for each cluster such that the mix of venues for each cluster is emblematic of a check-in temporal pattern type. Thus, the clustering can be based on probabilistic models, although it does not need to be, such as for the social similarity clustering. An advantage of using probabilistic models is that predictions and estimations of outcomes based on the underlying model(s) are more straightforward.

There are many beneficial uses for neighborhood clusters that are discovered through venue-check in data. Such uses include targeted advertising, real estate marketing, venue recommendations, urban design and city planning, business analytics, political uses, public health and safety, navigation, banking, national-security and others. These and other benefits of the present invention will be apparent from the description that follows.

FIGURES

Various embodiments of the present invention are described herein by way of examples in connection with the following figures, wherein:

FIG. 1 is a diagram of a computer system for discovering neighborhood clusters based on venue check-in data according to various embodiments of the present invention;

FIG. 2 diagrams a process flow of the computer system for discovering neighborhood clusters based on venue check-in data according to various embodiments of the present invention;

FIG. 3 is a table showing a process for spectrally clustering venues according to various embodiments of the present invention;

FIG. 4 is a table illustrating mixes of venues for various neighborhood typologies according to various embodiments of the present invention.

DESCRIPTION

Generally, embodiments of the present invention are directed to different ways of discovering or defining neighborhood clusters of a geographic region; in other words, producing synthetic groupings of geographic regions. In the description to follow, for simplicity and convenience, the geographic region is assumed to be a city, but it should be recognized that the techniques described herein could be used for other geographic regions, such as towns, townships, school districts, counties, states, etc., including both contiguous and non-contiguous geographic regions.

Figure 1:
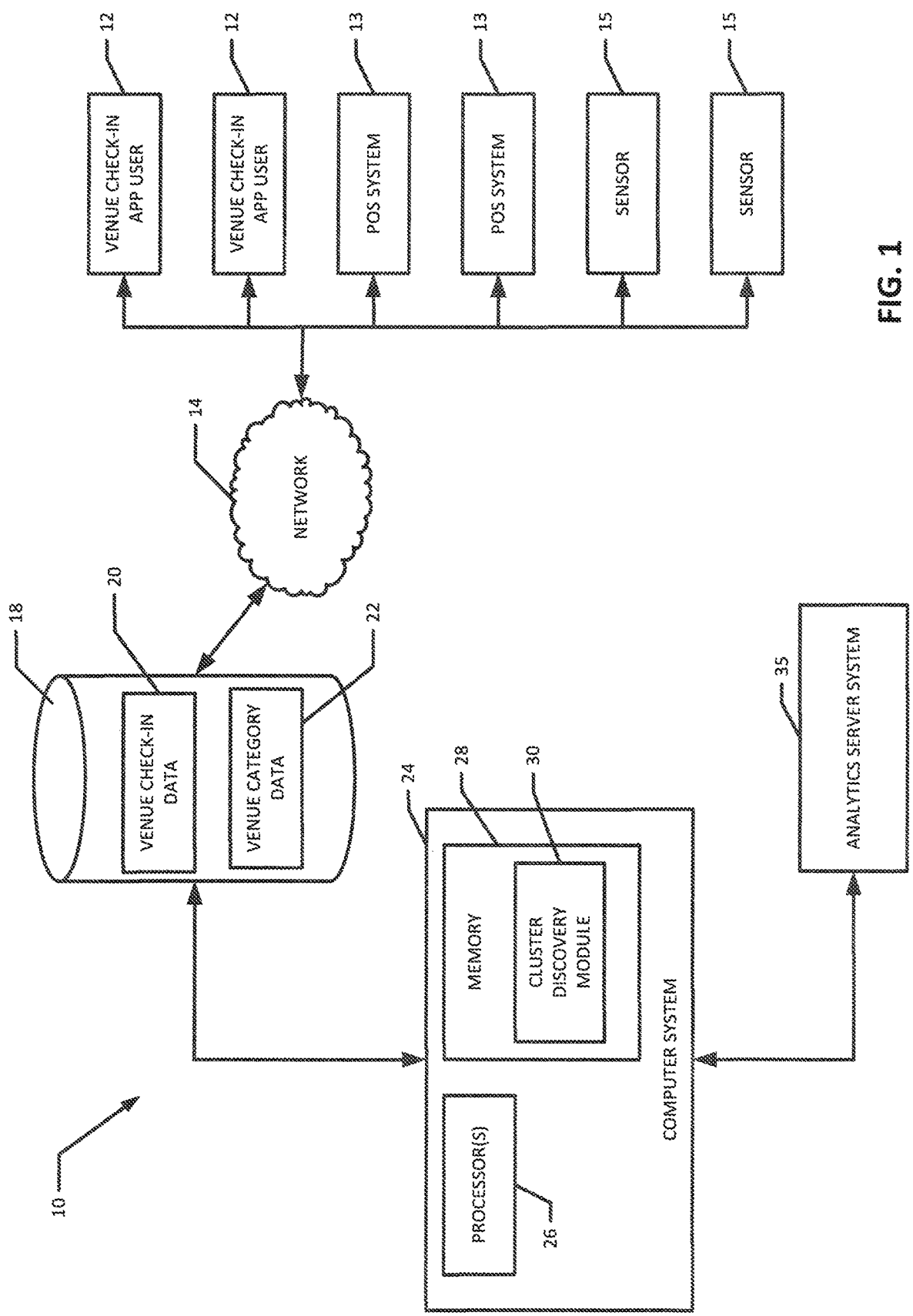

FIG. 1 is a diagram of a computer-based system 10 according to various embodiments of the present invention. As described below, the system 10 may discover the neighborhood clusters based on venue check-in data from, for example, venue check-in app users 12, point-of-sale (POS) systems 13, sensors 15, or any other data indicative of when a particular person was at a particular location or venue, or when a particular person indicates a preference about a particular location or venue (such as a venue rating or review system). Venue check-in apps are location-based social networking software applications than run on mobile computing devices of the users, such as smartphones, tablet computers, laptops, etc. The venue check-in apps allows the users to "check in" at venues; that is, indicate in real time that the user is at, or has arrived at, a particular, physical venue so that the user's presence at the venue can be shared with other users. Users can check in to a specific location by text messaging or by using a mobile application on their smartphone. Such mobile applications typically use the phone's GPS to find the current location. Many applications have a "Places" button or tab where a user can see a list of nearby places into which the user can check in. If a location is not on the nearby places list, the user can add the location directly from the phone. Venue check-in apps may allow the users to manually perform a check-in at a venue, for example by using GPS to provide a list of nearby venues, or they may perform a check-in automatically, for example by using GPS and other sensory data to determine which venue the user is currently at. Venue check-in apps may also perform a check-in as a component of some other task, for example while taking a photo from their smart-phone. Once users have checked in, they have the option of sharing their location with friends through social networking services such as Twitter or Facebook. The venues may be places to which people physically go, restaurants, bars, churches, buildings (e.g., school, office, government, etc.), retail stores, hospitals, banks, sporting event or entertainment locales, transportation facilities (e.g., bus depots, airports, etc.), museums, places of employment, or any other indoor or outdoor point of interest for which a user might wish to share their presence. Such venue check-in apps may include Foursquare, Google Latitude, Google+, Facebook, Twitter, Yelp, Instagram, and Brightkite.

The data from the POS systems 13 may be credit card, debit card, gift card, or other purchase data that shows that a user (i.e., the cardholder) was at a location or venue (i.e., the place of the POS system) at a certain time (i.e., the time of the transaction). For example, if a user uses a credit card to purchase a meal at a restaurant, the venue check-in data shows the user was at the restaurant at the time the card was swiped. The sensors 17 could be any type of sensor that detects that a particular person is present at a particular location (and at a particular time). Such sensors could include surveillance or other cameras, biometric sensors, robots, vehicle sensors (e.g., E-Z pass data), or other presence sensors (e.g., access logs for doors, etc.).

Accordingly, the user's check-in data may include, when available, among other things: (i) a user ID; (ii) a venue ID for the checked-into venue; and/or (iii) a time stamp indicating the time that the user checked into or made a transaction at the venue, etc. User check-in data that is shared publicly via a data network (e.g., the Internet 14) may be captured and stored in a data storage system 18. Similarly, the POS check-in data may be stored in the data storage system 18. For privacy purposes, card account numbers and dollar amounts for the POS transactions need not be stored. The data storage system 18 may comprise a number of data stores, which may be implemented as computer databases, data files, directories, or any other suitable system for storing data for use by computers. The data stores may comprise, for example, a venue check-in data store 20 that stores the venue check-in data from the users 12 and/or POS systems 13, and a venue data store 22. The venue data store 22 may store data that indicates the venue category-type for the various venues (e.g., pizza restaurant, Chinese restaurant, pediatrician's office, museum, stadium, etc.). Although only one venue check-in data store 20 is shown in FIG. 1, it may comprise multiple, discrete data stores, such as one or more data stores for data from venue check-in apps and one or more data stores for POS data. Geographical location data for the various venues (e.g., GPS coordinates) may be stored in the venue check-in data 20 and/or the venue data 22. For example, in addition to storing data about the type or category of a venue, the venue data may include the GPS coordinates or other location data for the venue. The data storage system 18 may be embodied as solid state memory (e.g., ROM), hard disk drive systems, RAID, solid state disks (SSDs), disk arrays, storage area networks (SANs), and/or any other suitable system for storing computer data. In addition, the data storage system 18 may comprise caches, including web caches and database caches. In various embodiments, services that collect the venue check-in data can be subscribed to in order to obtain the venue check-in data.

In various embodiments, preprocessing of the raw check-in data may be performed prior to identification of the clusters to avoid using spurious, unreliable and/or inapplicable check-in data. For example, "moving target" venues that do not reflect any single location, such as parades, buses and traffic jams, can be removed. Also, venues where only one person has checked in may be removed, because such venues are more likely to be jokes or otherwise illegitimate venues.

As shown in FIG. 1, the system 10 also includes a computer system 24 in communication with the data storage system 18. The computer system 24 may comprise one or more networked, electronic computer devices, such as servers, personal computers, workstations, mainframes, laptops, and/or handheld computing devices. As shown in FIG. 1, the computer system 24 may comprise one or more processor circuits 26, and one or more memory units 28. For convenience, only one processor circuit (referred to hereinafter simply as "processor") 26 and one memory unit 28 are shown in FIG. 1, although it should be recognized that the computer system 24 may comprise multiple processors and/or multiple memory units. The memory 28 may store a number of software modules, including a neighborhood cluster discovery module 30 as shown in FIG. 1. The modules, including the neighborhood cluster discovery module 30, comprise software code that is executed by the processor 26, which execution causes the processor 26 to perform various actions dictated by the software code of the various modules. In particular, execution of the neighborhood cluster discovery module 30 causes the processor 26 to discover the neighborhood clusters in a city or other geographic region based on the venue check-in data as described herein. The memory 28 may comprise primary computer memory, such as a read only memory (ROM) and/or a random access memory (e.g., a RAM). The memory 28 could also comprise secondary computer memory, such as magnetic or optical disk drives, SSDs, or flash memory, for example.

In various embodiments, the neighborhood clusters may be bounded geographic regions of a city that contain one or more venues. The clusters may or may not closely align with a city's residents' concepts of what the city's neighborhoods are. The clusters may be determined in any number of suitable manners, which may be particularly dependent upon the intended use of the determined clusters. Almost always, the geographical proximity of venues is a factor in grouping venues into a cluster; i.e., the closer two venues are to each other geographically, the more likely they are to being grouped together in neighborhood cluster. In one embodiment, no venue belongs to more than one neighborhood cluster. However, in other embodiments, a venue could be considered to belong to multiple clusters (e.g., 50% in one cluster and 50% in another cluster, etc.). This may be desirous depending on the intended application of the determined clusters. Also, in various embodiments, the clusters may be geographically contiguous, and each cluster may be unbroken; that is, a cluster does not comprise more than one isolated geographic regions.

Also as shown in FIG. 1, there may be one or more analytics server systems 35 that use the clusters determined by the computer system 24 for various applications. Those applications include, for example: targeted advertising; neighborhood quality scores; venue recommendations; urban design and city planning; real estate; business analytics; political use; and banking and investment. The analytics server systems 35 may obtain the determined clusters from the computer system 24 in any suitable manner, such as downloading over the Internet or other suitable data network. The analytics server systems 35 may use the determined clusters for purposes related to their specific application, examples of which are described generally further below. Each analytics server system 35 may comprise one or more networked servers (or other computing devices).

In one embodiment, in addition to proximity, venues are grouped based on the social similarity of the venues. In various embodiments, social similarity is assessed based on whether common users visit (or check-into) the venues. For example, if a large group of users (or "venue visitors") frequently check into a first venue (either through a mobile check-in app, an electronic POS transaction, an online venue review or rating system, etc.), and many of those same users also frequently check into a second venue, the first and second venues can be considered to have a social similarity. The following describes, in connection with the flowchart of FIG. 2, one technique of the processor 26, executing the code of the neighborhood cluster discovery module 30, for clustering venues based on geographical proximity and social similarity. Suppose that V is a set of $n_V$ venues in the target city and that for each i, j∈V, at step 40, a geographical distance is computed d(i,j) based on, for example, the GPS coordinates (latitude and longitude) for the venues i,j. Also suppose that set U is a set of $n_U$ users, and set C is a set of check-ins of these users to the venues in V. Ignoring for now the temporal aspects, each venue v may be represented by the "bag of check-ins" to v. That is, at step 42, an $n_U$ dimensional vector $c_v$ is computed, where the $u^{th}$ component of $c_v$ is the number of times user u checked-in to venue v. That is, the $n_U$ dimensional vector $c_v$ can be considered a vector of check-in intensity, or a check-in intensity vector.

The similarity between pairs of venues can then be determined by computing a measure of the similarity between the check-in intensity vectors for the pairs of venues. Under the above representation, a social similarity s(i, j) between each pair of venues i, j∈V can be computed by comparing the vectors $c_i$ and $c_j$. This can be computed at step 44, in one embodiment, using the cosine similarity for this measure, yielding $$s(i, j) = \frac{c_i \cdot c_j}{\|c_i\| \|c_j\|}.$$

In other words, the inner product of $c_i$ and $c_j$, divided by the product of their norms. In other embodiments, different techniques for computing the social similarity at step 44 can be used. For example, the Jaccard similarity measure could be used, where s(i,j) equals the number of users who checked into both venue i and venue j, divided by the number of users that checked into either venue i or venue j. In yet other embodiments, a vector-distance-similarity may be used, e.g., the distance d between vectors $c_i$ and $c_j$. Then, s(i, j)=$f$(d) for some positive, non-increasing decay function. Suitable decay functions include, but are not limited to: (i) a window decay function, where θ(x)=1 if x<a for some threshold a, and $f$(x)=0 otherwise; (ii) an exponential decay function, where $f$(x)=$e^{-x/a}$; or (iii) a logistic decay, where $$f(x) = \frac{e^{-x+a}}{1 + e^{-x+a}}.$$

Next, at step 46, an $n_v \times n_v$ affinity (or similarity) matrix $A=(a_{i,j})_{i,j=1, \ldots, n_v}$ may then be computed. A number of different techniques can be used to generate the affinity (or similarity) matrix. In one embodiment, if venue j is one of the m closest venues to venue i, then the similarity for i and j, denoted a(i,j), can be computed as a(i, j)=g×s(i, j)+α and equals zero (0) if venue j is not one of the m closest venues to venue i. In other words, for a given venue v, let $N_m(v)$ be the m closet venues to v according to the distance d(v,•) for some parameter m. Then, let $$a_{i,j} = \begin{cases} g \times s(i, j) + \alpha & \text{if } j \in N_m(i) \text{ or } i \in N_m(j) \\ 0 & \text{otherwise} \end{cases} \quad (1)$$

where α is a small constant that prevents degenerate values from having no connections to any others and g is positive constant. In other embodiments, different techniques to generate the affinity matrix A can be used. For example, if venue j is within threshold distance r from venue i (i.e., d(i,j)<r), then a(i, j)=g×s(i, j)+α and equals zero (0) if venue j is not within the threshold distance from venue i. In yet another embodiment, a(i, j)=g×$f$(d(i, j))+h×s(i, j) where d(i, j) is the distance between i and j, and $f$ is a positive, non-increasing decay function (such as a window, exponential or logistic decay function). Preferably g+h=1, where g>0 and h>0. Another, more trivial, embodiment is to let a(i,j)=s(i,j).

A graph representation G(A) may then be created at step 48. Viewed as a graph, each venue node may be connected with an undirected edge to its m nearest neighbors by geographic distance, and the edges are weighted according to the similarity measure of the distributions of check-ins at the two venues.

Then, in various embodiments, at step 50, the clusters may be determined based on V, A=(ai,j), G(A) the graph of A, $k_{min}$, $k_{max}$, and τ. In one embodiment, spectral clustering may be used for step 50, and FIG. 3 shows an algorithm for spectrally clustering the venues according to various embodiments. First, a diagonal degree matrix D is computed with diagonal $(d_1, \ldots, d_{nv})$, where $$d_i = \sum_{j=1}^{n_v} a_{i,j}.$$

Next, compute L: =D−A and compute $L_{norm}$: =$D^{-1/2}LD^{-1/2}$. Then, in one embodiment, let $\lambda_1 \leq \ldots \leq k_{max}$ be the $k_{max}$ smallest eigenvalues of $L_{norm}$. Also, set k=arg $\max_{i=k_{min}, \ldots, k_{max}-1} \Delta_i$ where $\Delta_i = \lambda_{i+1} - \lambda_i$. Next, the k smallest eigenvectors $e_1, \ldots, e_k$ of $L_{norm}$ are found. Then, let E be an $n_v \times k$ matrix with $e_i$ as columns. Next, let $y_1, \ldots, y_{n_v}$ be the rows of E, and cluster them into $C_i, \ldots, C_k$ with k-means. This includes a clustering of $A_1, \ldots, A_k$ by $A_i = \{j | y_j \in C_i\}$. Like some prior works, a post-processing step may be used to clean up any degenerate clusters. For example, for each $A_i$, let $G(A_i)$ be the subgraph of G(A) induced by vertices $A_i$. $G(A_i)$ may be split into connected components. Each component may be added as a new cluster, removing $G(A_i)$. Finally, any clusters that span too large of a geographic area may be removed by, for example, letting b be the area of a bounding box containing coordinates in V, and $b_i$ be the area of the box containing $A_i$. If $$\frac{b_i}{b} > \tau,$$

cluster $A_i$ may be deleted, and each $v \in A_i$ may be redistributed to the closest $A_j$ under single linkage distance $d(v, A_j)$. In other embodiments, different techniques for choosing the number of clusters (k) may be used, or the number of clusters may be set in advance. The above-description is one variation of spectral clustering and in other embodiments other variations of spectral clustering could be used, such as variations with different methods for computing L given A. Still further, other graph-based clustering algorithms besides spectral clustering could be used, such as (but not limited to) hierarchical clustering, density-based clustering, centroid-based clustering such as k-means, distribution or model based clustering such as Gaussian mixture models, graph partition clustering, social network community detection, graph layout-based clustering, and others.

Referring back to FIG. 2, another aspect of the present invention is that different clusters in a city can be compared at step 52 based on the similarity of the distributions of users that visit them. Again, a cosine similarity measure may be used in various embodiments for making this comparison. This may be done, for example, by representing each cluster $A_i$ as an $n_U$ dimensional vector $c_{A_i}$, where each component u is the number of check-in users it had to any venue in $A_i$. The similarity between all pairs of clusters may then be computed as $$s(A_i, A_j) = \frac{c_{A_i} \cdot c_{A_j}}{\|c_{A_i}\| \|c_{A_j}\|}.$$

Note that by only connecting each venue v to its m nearest neighbors in geographic distances keeps the matrices extremely sparse, which thereby enables scaling the process to hundreds of thousands of venues without any need for parallelization. Large sparse matrices can be efficiently stored, and the first k eigenvectors can be computed quickly, either with exact methods, or with approximation methods such as a Lanczos solver. Moreover, the set of nearest neighbors Nm(v) can be computed in a highly efficient manner using k-d trees.

Figure 5:
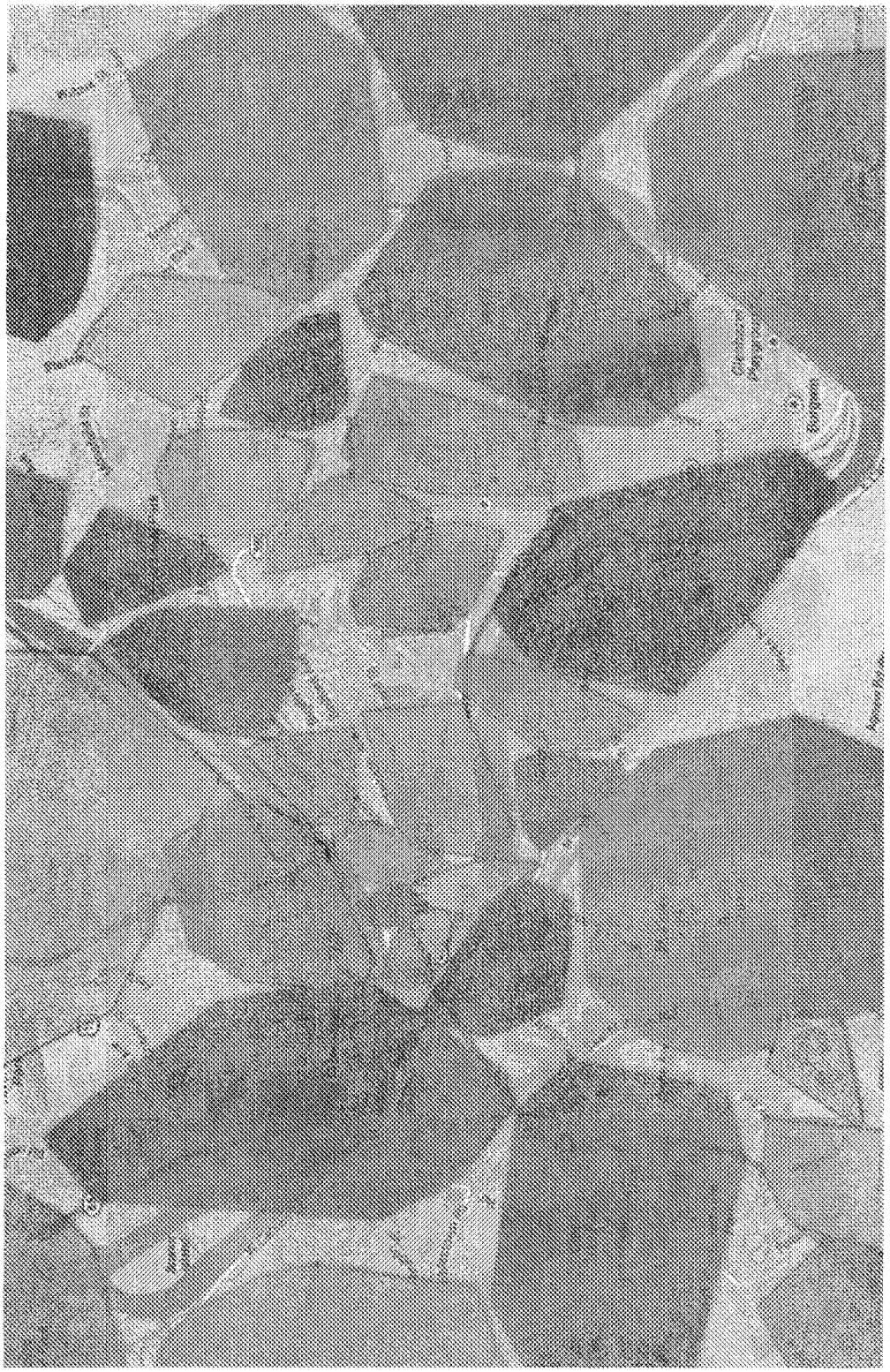
FIG. 5 is a map of a portion of Pittsburgh, Pa. showing various clusters in the city produced according to an embodiment of the present invention.

This technique for discovering neighborhood clusters was used for the city of Pittsburgh, Pa., where m=10, α=0.01, $k_{min}$=30, $k_{max}$=45, and τ=0.4. FIG. 5 is a map of a portion of Pittsburgh showing the discovered clusters. As can be seen in this example, the clusters are not the same geographic shape or size. The areas between clusters generally correspond to areas without venue check-in data (e.g., residential areas, wooded areas, etc.). Also as shown in this example, there is generally not much overlap between clusters, although as mentioned above the model could be set up to permit greater overlap between clusters.

Referring back to equation (1) above, different values for the closest number of neighbors m may be used to generate the affinity matrix A depending on how tightly clustered the venues should be. Also, in yet other embodiments, the matrix A could omit any social similarity component. In such an embodiment, the elements of the matrix A could merely be the geographical distance between the two venues.

In other embodiments, other measures of intensity besides counts of check-ins can be used for the check-in intensity vector. For example, the intensity measure could use binary value; that is, for example, 1 if the venue visitor checked into the venue a threshold number of times or more in a given time period, and 0 if not. Or more complex functions could be used to measure the venue visitors' intensities of check-in to the various venues. Also, in an embodiment where venue rating system data is available and used, a venue visitor's intensity for a venue may be a function of the visitor's rating for the venue (e.g., greater intensity for a more positive rating). Also, another variation on the above-described embodiments is that the social similarity between the pairs of venue may be evaluated for certain time period. For example, using check-in time data the social similarities could be measured for morning hours, afternoon hours, evening hours, etc., or some other time windows. Also, the time periods for measuring social similarities could be a series of days, weeks or months, for example (e.g., similarity in the spring, summer, winter and fall). In addition, while the above embodiments measured social similarity based on whether common users visited the venues, social similarity could also be measured in other embodiments based on whether common groups of users visited the venues, such as whether members of an organization (e.g., school, business, etc.) or other grouping (e.g., demographic grouping if such data is available) visited the venues.

In another embodiment, the clusters may be segmented so that the mix of multiple venues in a cluster is emblematic of some urban or neighborhood typology. The urban typologies can be city neighborhood types or districts such as: a shopping district; a university neighborhood; the sporting area district; the cultural district; the financial district; rail or air travel areas; Chinatown; etc. For a venue $x_i^j$ of the $i^{th}$ venue category in city j, if it is assumed, given a venue's assignment to a cluster, and a cluster's assignment to a typology, that $x_i^j$ is drawn from a discrete distribution over venue categories specific to assigned typology, then typologies can be thought of as latent topics in a latent variable probabilistic model.

Choosing the appropriate number of clusters for a city can be difficult because each city is likely to have a different number of clusters. In one embodiment, the number of clusters in a city can be selected beforehand, based on, for example, the size of the city and/or previous studies or data about the neighborhoods in the city.

In another embodiment, the clusters are determined by dividing areas into neighborhoods that are emblematic of a certain type. One way to do this is to use probabilistic (generative) modeling, and in particular topic modeling. For example, non-parametric Bayesian modeling could be used, such as the distance dependent Chinese restaurant franchise model. Inference can then be used to determine the clusters. "Inference" refers to the computing of a probabilistic distribution over the hidden (i.e., unobserved) variables, given the data. In this setting, the hidden variables can include assignments of venues to neighborhood clusters, assignments of neighborhood clusters to typologies (venue category topic), and, in an embodiment discussed further below, assignments of neighborhood clusters to a temporal rhythm topic. In Bayesian probabilistic modeling, this is done by posterior inference, where Bayes rule is used to compute the posterior distribution given the likelihood and the prior distributions: p(B|A)=P(B)P(A|B)/P(A). Here p(B|A) is the posterior distribution to be computed, where B represents the hidden variables of interest. In other words, a nonparametric Bayesian method places a prior on a potentially infinite number of components (clusters), and then use posterior inference to determine the number of components (clusters) given the data In some cases it is possible to compute this exactly if the components P(B), P(A|B), and P(A) take some known and tractable forms. Yet in many real world cases, this is not the case, and approximate inference techniques may be used. In one embodiment, Gibbs sampling, a type of Markov Chain Monte Carlo (MCMC) method, is used. Further, the Chinese restaurant process (CRP) and the Chinese restaurant franchise are two suitable modeling methods and are described below, and with the following variables and notation:

TABLE 1

| | Variables & Notation |
|---|---|
| V | A fixed set of venue categories. |
| $x_i^j$ | The observed datum. $x_i^j \in V$ is the category of venue i in city j. |
| $x^j$ | $x^j = (x_1^j, x_2^j, \ldots)$ are the observations from city j, and $x = (x^1, x^2, \ldots)$ are the observations for all cities. |
| $A^j$ | $A^j$ is the venue similarity matrix for city j. |
| $c_i^j$ | $c_i^j \sim \text{ddCRP}(\alpha, A^j)$ is the customer assignment associated with $x_i^j$ in the ddCRP for city j. |
| $c^j$ | $c^j = (c_1^j, c_2^j, \ldots)$ are the customer assignments associated with $x^j$, and $c = (c^1, c^2, \ldots)$ are the customer assignments for all cities. |
| $z(c^j)$ | $z(c^j) = (t_1^j, t_2^j, \ldots)$ are the table assignments induced by $c^j$, where $z(c_i^j) = t_i^j$ is the table assignment associated with $x_i^j$. $z(c) = (z(c^1), z(c^2), \ldots)$ are the table assignments for all cities. |
| $T(c^j)$ | The set of occupied tables given a customer assignment $c^j$. $T(c^j)$ is the unique set of indicators taken by elements of $z(c^j)$. $T(c) = \cup_j T(c^j)$ are the set of all tables across all cities. |
| $k_t$ | For a table $t \in T(c)$, $k_t \sim \text{CRP}(\beta)$ is the table's topic parameter. $k(c) = (k_1, k_2, \ldots)$ are the topic assignments for all $t \in T(c)$. $k(c_i^j)$ is the topic assigmnent to $x_i^j$. |

TABLE 1-continued

| | Variables & Notation |
|---|---|
| $x_{k'}$ | For a topic parameter k' we let $x_{k'} = \{x_i^j : k(c_i^j) = k'\}$ denote the set of observations assigned to a table of topic k'. |

The Chinese restaurant process (CRP) is a stochastic process that describes a distribution over partitions of a potentially unbounded number of items. The process by which random partitions are generated from the CRP can be described by the following analogy. Imagine a Chinese restaurant with an infinite number of initially empty tables, each of infinite capacity. Customers, the items to be partitioned, enter the restaurant sequentially, and sit at a table according to the following rule: they choose an occupied table with probability proportional to the number of people currently sitting there, and they sit alone at a new table with probability proportional to a scale parameter α. Once all the customers have entered, the resulting seating assignment induces a partition where the occupied tables specify the grouping. If $z_i$ is an indicator variable of the table assignment to i, then the seating assignment is given by.

$$p(z_1 = k \mid z_{1:(i-1)}, \alpha) \propto \begin{cases} n_k & k \leq K \\ \alpha & k = K+1 \end{cases}$$

where $n_k$ is the number of people currently sitting at table k, and K is the current number of occupied tables at round i. This process produces a power law distribution over cluster sizes.

The CRP, an alternate formulation of the Dirichlet process, is often used as a prior over mixture components in a mixture model. In the CRP mixture model, each table k is endowed with a parameter $\theta_k$ and each observed datum x, is modeled as coming from a distribution $x_i|\theta_{k_i} \sim F(\theta_{k_i})$. To extend the restaurant analogy, the parameter $\theta_k$ can be thought of as a dish that is shared by all customers at table k. This provides a flexible way to model and infer the number of mixture components, when the quantity is not known a priori.

The Chinese restaurant franchise, an alternate formulation of the hierarchical Dirichlet process, extends the CRP metaphor to multiple restaurants, each sharing the same menu of dishes. As customers arrive, they sit at tables in the same manner as with the CRP. The first customer to sit at a table will order a dish from a menu with an unbounded number of dishes shared by all restaurants. Each subsequent customer that sits at this table will share this dish, and the same dish can be served at multiple tables. Furthermore, the choice of dish made by this customer is itself a draw from a CRP over menu items. This creates a bias for preferential attachment both at the table level, and at the dish level—customers prefer to sit at popular tables, and prefer to order popular dishes. The number of tables and number of dishes is inferred from the data given the prior. The Chinese restaurant franchise can be thought of as a nonparametric topic model, where restaurants correspond to groups in the data, and dish assignments correspond to topics.

Although defined sequentially, CRPs implicitly assume that the observed data are exchangeable—that the posterior probability of any seating assignment does not depend on the order in which the customers enter the restaurant. Exchangeability is a natural assumption that has been used with great success in many domains, for example the "bag of words" representation of text assumes that the words within each document are exchangeable. However, in a spatial setting, where we wish to discover clusters of contiguous venues, we require a strong bias towards clustering a venue with other nearby venues. In this setting, the exchangeability assumption will not suffice.

Recently, the distance dependent Chinese restaurant process (ddCRP) was introduced, which specifies a distribution over partitions of non-exchangeable data. The ddCRP also imagines customer seating arrangements in an eatery. However, rather than assigning each customer to a table as they enter the restaurant, the ddCRP assigns each customer i to sit with another customer j with probability proportional to a measure of similarity between them $s_{i,j}$. Once all the customers have chosen with whom they will sit, the connected components in the graph of customer assignments induce a table assignment to the customers, all customers in the same connected component are seated together at a table. More formally, let $A=\{a_{i,j}\}$ be a matrix of pairwise similarities between customers (e.g., the affinity matrix A above), let $\alpha$ be a scaling parameter, and let $c_i$ be a random variable for the assignment to customer i. Then $$p(c_i = j | A, \alpha) \propto \begin{cases} s_{i,j} & j \neq i \\ \alpha & j = i \end{cases} \quad (2)$$

defines the ddCRP prior over customer assignments. Just as with the CRP, the ddCRP can be used as a nonparametric prior over mixture components. Note that the ddCRP is a strict generalization of the CRP. If $s_{ij}=1$ if and only if $i<j$, then the resulting process defines a CRP. The similarity matrix A is a flexible way to specify prior assumptions about the strength of relationships between pairs of venues.

The ddCRP mixture model is an appealing nonparametric Bayesian option for clustering cities with check-in data. And yet, if each discovered neighborhood is endowed with its own unique emission distribution, this does not allow the flexibility to derive insights about commonalities in different cities. It will also lead to neighborhoods consisting of venues of relatively homogenous venue categories, rather than neighborhoods with venues that reflect the syntax of common neighborhood types.

To overcome these limitations, the ddCRP in a hierarchical setting may be used in various embodiments. In one approach, the observations in different groups are linked by sharing the neighborhood parameters across the cities. Such a model can be thought of as an extension of the Chinese restaurant franchise formulation of the hierarchical Dirichlet process, where group level variables are drawn from a CRP, but observation level variables are drawn from a ddCRP. Table 2 below illustrates the generative process for the model according to one embodiment. Topic parameters $\phi_k \sim \text{Dir}(\lambda)$ for each topic k (e.g., neighborhood typology) are drawn whenever needed. Next, for each city j in the corpus of cities to be evaluated, for each venue i, $c_i^j \sim \text{ddCRP}(\alpha, A^j)$ is sampled. The connected components of $c^j$ induce neighborhood assignments $t_i^j$ to neighborhoods $T(c^j)$. Then, for each neighborhood $t \in T(c^j)$, a topic $k_t \sim \text{CRP}(\beta)$ is sampled. Then, for each venue i, the observation $x_i^j \sim \text{Discrete}(\phi_k)$ is sampled for $k := k_{t_i^j}$. Like the Chinese restaurant franchise, the topics are shared across all cities. Within each city, venues can be segmented according to a ddCRP prior, where the emission distribution parameter can be drawn from a CRP over the global set of topics.

TABLE 2

1. Draw topic parameters $\phi_k \sim \text{Dir}(\lambda)$ for each topic k whenever needed
2. For each city j:
   (a) For each venue i, sample $c_i^j \sim \text{ddCRP}(\alpha, S^j)$. The connected components of $c^j$ induces neighborhood assignments $t_i^j$ to neighborhoods $T(c^j)$
   (b) For each neighborhood $t \in T(c^j)$, sample a topic $k_t \sim \text{CRP}(\beta)$
   (c) For each venue i, sample the observation $x_i^j \sim \text{Discrete}(\phi_k)$ for $k := k_{t_i^j}$ Recall that the goal, in one embodiment, is to separate a city into distinct clusters of contiguous venues, or "neighborhoods," where the combination of venue categories that are observed in a given neighborhood realizes some abstract notion of "neighborhood type." Furthermore, the set of possible neighborhood types is something that is shared across all cities. Posterior inference on the model in Table 2 given a corpus of cities $x^1, x^2, \ldots$ and an appropriate set of distance functions, will produce a segmentation of each city into spatially contiguous clusters. All observations in a given cluster are drawn from the same mixture component, a multinomial distribution over venue categories, and the set of possible mixture components (or topics) is shared across the entire corpus. As desired, topics express a notion of neighborhood typology.

Given the observed data x and the prior parameters, the city clusters and topic assignments can be discovered through posterior inference. The central goal in this process is to compute the distribution of latent variables conditioned on the observed data and the model parameters. In this setting, this amounts to computing $p(c, k|x, A, \alpha, \beta, \lambda)$. Any suitable statistical inference process may be used by the computer system 24 (e.g., by the processor 26 executing code of the cluster discovery module 30) for this computation. In one embodiment, Gibbs sampling, a Markov Chain Monte Carlo (MCMC) method, may be used with a state space over configurations of the latent variables, and with a stationary distribution equal to the one in question.

In Gibbs sampling, samples are iteratively drawn from the distribution of each individual latent variable conditioned on estimates for all the others obtained in previous rounds. In one embodiment, the Gibbs sampler follows closely that of D. M. Blei and P. I. Frazier, "Distance dependent Chinese restaurant processes," J. Mach. Learn. Res., 2461-2488, November 2011 for the ddCRP, as well as the extension of the ddCRP to hierarchical modeling by Ghosh et al., "Spatial distance dependent Chinese restaurant processes for image segmentation," Neural Information Processing Systems, 2011, both of which are incorporated herein by reference in their entirety. The sampler preferably operates in a grouped data setting, where some parameters are shared across the groups.

For ddCRP customer assignments, the following is computed:

$$p(c_i^j | c_{-ij}, k(c_{-ij}), x, A, \alpha, \beta, \lambda) \propto p(c_i^j | A, \alpha) p(x|z(c), k(c), \lambda) \quad (3)$$

Here the convention that $c_{-ij} = c/c_i^j$ are the customer assignments for all c except $c_i^j$ is used, and $c = c_i^j \cup c_{-ij}$ is made up of the new $c_i^j$ at this round, and the values for $c_{-ij}$ from prior rounds. The first term is the ddCRP prior given by equation (2). The second term describes how the topic assignments for $c_i^j$ change in moving from $z(c_{-ij})$ to the new $z(c)$. If $c_i^j$ generates a new ddCRP table, a new topic assignment must be made.

The final term in equation (3) is the likelihood of the data given the new configuration $c = c_i^j \cup c_{-ij}$. Computing this can be thought of by removing the old $c_i^j$ link, and seeing how the likelihood is affected by each possible new value for $c_i^j$. Factorizing the likelihood in the following way, $$p(x \mid z(c), k(c), \lambda) = \prod_{k' \in k(c)} p(x_{k'} \mid z(c), k(c), \lambda) \quad (4)$$

its contribution to equation (3) can be computed by observing how moving from $z(c_{-ij})$ to $z(c_i^j \cup c_{-ij})$ changes the terms in this product.

$$p(c_{ij}^{new} \mid x, c_{-ij}, k(c_{-ij}), A^j, \alpha, \beta, \lambda) \propto \quad (5)$$

$$\begin{cases} \alpha & \text{if } c_i^j = i' \\ s_{ii'}^j & \text{if } c_i^j = i' \text{ does not join tables} \\ a_{ii'}^j J_{l,m}(x, c_{-ij}, k, \lambda) & \text{if } c_i^j = i' \text{ joins } l \text{ and } m \end{cases}$$

$$J_{l,m}(x, c, k, \lambda) = \frac{p(x_{k_l \cup m} \mid \lambda) p(x_{k_m \setminus n} \mid \lambda)}{p(x_{k_l} \mid \lambda) p(x_{k_m} \mid \lambda)} \quad (6)$$

where $x_{k_l \cup m}$ is all observation of topic $k_l$ together with observations from table m, and $x_{k_m \setminus m}$ are observations of topic $k_m$ without table m. For the CRP topic assignments, samples may be made from:

$$p(k_t^{new} \mid x, k_{-t}, c, A, \alpha, \beta, \lambda) \propto p(x \mid z(c), k_t^{new}, k_{-t}, \lambda) \, p(k_t^{new} \mid k_{-t}) \quad (7)$$

The inventors have conducted experiments of the above-described technique for discovering neighborhood typologies for a number of cities—including Chicago, Los Angeles and New York City (in particular, Manhattan). A dataset of approximately 16 million foursquare check-ins was used. Eleven million of these were extracted from the data released by Cheng et al. ("Exploring millions of footprints in location sharing services," AAAI ICWSM, 2011) of check-in Tweets from various location-based social networks. The inventors collected the remaining 5 million check-ins over six months in 2011 by first searching the Twitter API for foursquare check-ins that have been posted by users to their Twitter public feed. The venue names, venue IDs, and the categories for each of these check-in locations were then found by aligning the check-in Tweets with the foursquare API. Although the foursquare API does give a city name attribute for each venue, these fields are user generated content, and can often be noisy and inconsistent. For example, one venue might be described as being in "Brooklyn," while the neighboring venue might be in "BKLYN," or in "NYC." To rectify these inconsistencies, TIGER/Line municipal boundary Shapefiles published by the United States Census Bureau were used to assign venues to their proper local administrative unit (e.g. city or town). Venues within New York City were further assigned to their respective borough. Table 3 below shows the high-level venue check-in data used in the testing after preprocessing.

TABLE 3

| City | Venues | Checkins | Users |
| --- | --- | --- | --- |
| Chicago | 24298 | 367231 | 38439 |
| Los Angeles | 20836 | 228941 | 33776 |
| Manhattan | 19610 | 486402 | 63436 |

A MATLAB implementation of the above Gibbs sampling algorithm for posterior inference was used. It used portions of the ddCRP Gibbs sampler released by Ghosh et al. ("From deformations to parts: Motion-based segmentation of 3d objects," Advances in Neural Information Processing Systems 25, pp. 2006-2014, 2012, incorporated herein by reference) for 3D Mesh segmentation, which was modified and extended it to fit the hierarchical model. In particular, an additional sampling step for estimating the CRP topic variables within each neighborhood was used. Though each iteration of the ddCRP can be expensive, the sampler takes large steps with each iteration, allowing it to converge after relatively few rounds. In the testing, the sampler was run for 7 iterations. Table 4 shows some high level statistics about the converged state.

TABLE 4

| City | # Clusters | # Topics |
| --- | --- | --- |
| Chicago | 211 | 22 |
| Los Angeles | 235 | 25 |
| Manhattan | 131 | 19 |
| Total | 577 | 32 |

The table at FIG. 4 shows a subsample of the learned topics. Many of the topics very clearly represent a canonical sense of a neighborhood typology. For example the college neighborhood (topic 11) naturally contains many academic buildings, but it also contains venues types such as bars, coffee shops, and apartments. The coastal neighborhood has marinas, scenic lookouts, and ferries, but it also has (perhaps high-end) condos. On the whole, the topics that the model produced were quite expressive of many common building blocks of the urban form.

The experiments showed that the models excelled at identifying how a neighborhood sometimes seems to diffuse from its core. For example, for college neighborhoods, the boundaries cluster extended well beyond the official defined college campus boundary (the neighborhood core), where all the academic buildings are located. There are two reasons for this diffusion from the core area. First, it is common for students, especially in an urban campus, to explore the venues in the immediate neighborhood of the campus, thus the check-in patterns will bias nearby off campus venues towards being clustered with the campus. However, there is also a bias in the type of venue that is typically found near a university, for example a college bar, or a diner. Thus this diffusion allows a notion of "college neighborhood" to be to be captured, which is similar but distinct from "college campus." This hypothesis is also confirmed by the venues listed in topic 11 of FIG. 4, which in addition to standard university campus venues, includes bars and coffee shops. The experiments also manifested this phenomenon for other neighborhoods types, such as rail travel neighborhoods, where the discovered clusters diffused beyond the boundaries of the train stations (e.g., Penn Station and Grand Central Station in New York) to include various peripheral venues that help serve the influx of commuters, such as coffee shops, bakeries, delis, and bus stations, all popular places in topic 3 in Table 4.

In other embodiments, different statistical inference processes besides Gibbs sampling may be used by the computer system 24, such as variational Bayes method, particle filters, and sampling technique besides Gibbs sampling, including other MCMC sampling techniques.

In another embodiment, rather than identifying clusters that are emblematic of neighborhood types based on the mix of venues, the computer system 24 may identify clusters that are emblematic of neighborhood types based on temporal check-in patterns. In such an embodiment, the computer system may generate, for example, for each venue, from the venue check-in data, a vector of average number of check-ins by time period for the venue. For example, if the time periods are the hours in 24-hour cycle, the vector could include the average number of check-ins at the venue from 12:01 am to 1:00 am, from 1:01 am to 2:00 am, from 2:01 am to 3:00 am, . . . , 11:01 pm to 12:00 am. Inference, e.g., Gibbs sampling, could then be used to identify clusters of venues with similar temporal check-in patterns, given the venues' temporal check-in distributions.

Similar to step 52 of FIG. 2, different clusters in a city, whether produced using a probabilistic model as described above or not, can be compared based on the similarity of the distributions of users that visit them.

In other embodiments, combinations of these clustering techniques could be used. For example, the models that identify clusters emblematic of neighborhood typologies based on the mix of venues or the temporal check-in patterns may each rely on a similarity (or affinity) matrix A that is based on the social distance between venues (see equation (1) above). In other embodiments, the clusters of venues could be identified with either of these models without using the social distance between venues, in which case the models would just use the geographic distance between pairs of venues. In yet another embodiment, all three models could be combined. For example, clusters could be identified using inference that are emblematic of neighborhood typologies that are defined by both the mix of venues and the temporal check-in patterns, and the similarity (or affinity) matrix A may or may not include the social distance component when identifying the neighborhood clusters.

In other embodiments, rather than clustering venues as described above, the system could be used to cluster sub-regions in the geographic region, where the sub-regions themselves contain multiple venues. For example, the sub-regions could be census tracts, school districts, or some other geographic regions with defined boundaries. In that case, rather than determining the mix of venues that make up the clusters, the system may determine the mix of geographic sub-regions that make up the clusters. Again, the sub-regions could be grouped, for example, based on social similarity (e.g., whether common users check into venues in the geographic sub-regions), or whether the geographic sub-regions are emblematic of certain geographic area typologies, or emblematic of temporal check-in pattern types, or combinations thereof. For social similarity clustering, the elements of the check-in count vector would show the cumulative number of times that the venue visitors checked into venues in the various geographic sub-regions over a period of time, and the elements of the pairwise similarity matrix would correspond to the similarity score between pairs of geographic sub-regions. For emblematic typologies, the system may use statistical inference from a probability distribution, based on patterns of venue category type emblematic of a region type, such that the mix of geographic sub-regions for each cluster is emblematic of a region type. For emblematic temporal patterns, the system may use statistical inference from a probability distribution, based on patterns of check-in time in the venue check-in data, such that the mix of geographic sub-regions for each cluster is emblematic of one of a predetermined number of temporal check-in pattern types.

As mentioned above in connection with FIG. 1, one or more analytics server systems 35 may use the neighborhood clusters determined by the computer system 24 for various practical applications. Various potential applications of the determined clusters are now described.

One application of the determined clusters is targeted marketing and advertisement campaigns. Advertisers could use the analytics server system 35 to carve out geographic areas of common activities to define new marketing/sales territories, and then determine specific targeted ads for specific territories, or the people that visit the territories. The advertising campaigns could include physical or digital ads. Physical advertisement may include optimally placing billboards, optimally sending out direct mail advertisements, and/or designing store promotions based on the neighborhood clusters. Digital advertisements may include sending targeted advertisements to a users' mobile phone based on the defined neighborhood clusters and/or displaying targeted advertisements on a website based on the defined neighborhood clusters (e.g., along side content relevant to venues in a cluster).

Another application is neighborhood quality scores. The analytics server system 35 could use the neighborhood clusters, the venues seen in each of these clusters, and the check-in patterns seen at these venues to define a "quality" for a neighborhood, using various specified criteria for assessing neighborhood quality. For example, neighborhoods where people can stay within their neighborhood to get the resources that they need might have a higher neighborhood quality score. The quality scores computed by the analytics server system 35 based on the clusters could include quality of life scores (thereby obviating or reducing the need to do door-to-door quality of life surveys) and marketing scores for real estate sales (similar to a "walk" score). For example, neighborhood quality scores could be based on clustering in a way to entice people to buy or rent a vacant property.

Another application is venue recommendations. The analytics server system 35 could use the neighborhood clusters to recommend new locations to visit based on previous check-ins. For example, analytics server system 35 could use the neighborhood structure as a component in a recommendation system for restaurants or with respect to travel or tourist destinations. With respect to the tourism venue recommendations, the analytics server system 35 could be used by an online website mobile app to help users select a hotel based on the neighborhood clusters of the city, including what cluster the hotel is in, and its characteristics. Similarly, the analytics server system 35 could use the neighborhood clusters to recommend attractions to tourists. Attraction recommendations could be displayed on a website or mobile app to the user one by one, or in the form of an itinerary. The analytics server system 35 could also compare the clusters in the user's destination city with clusters in the user's home city in order to recommend attractions based on the things the user might like to do in his/her home city.

Another application is urban design and city planning, such as transportation planning, forecasting and development. For transportation planning, for example, the analytics server system 35 could use the neighborhood clusters to predict traffic patterns using, for example, a probabilistic model to predict relationships between traffic observations. For example, the analytics server system 35 could assess what other areas will be affected when traffic is high in one particular area/cluster. The analytics server system 35 could also detect flaws in the city transportation system based on the neighborhood clustering models. For example, the analytics server system 35 could assess and detect whether two (or more) neighborhood clusters are highly related, yet that the transportation corridor between them is insufficient. Also, the analytics server system 35 could identify engineering changes to the city transportation system based on neighborhood clustering (e.g., deciding the right place to put a bridge, etc.). As to forecasting, the analytics server system 35 could predict the affects of proposed planning activities on the neighborhood structure based on the determined clusters (e.g., impact assessment of neighboring clusters if a given area is rezoned). As to development, the analytics server system 35 could use the clustering as a tool to understand a proposed development site and inform development decisions. For example, the analytics server system 35 could be used in assessing what people who come to a particular neighborhood cluster do; or where do they go to get certain resources; or who else comes to the cluster and from where do they come. Further, the analytics server system 35 could asses the impact of changes because of development based on the determined clusters, such as assessment of how addition of a particular type of venue to the cluster will impact the neighborhood or other nearby neighborhoods.

A related potential application is real estate. For example, based on the determined clusters the analytics server system 35 could aid in predicting what type of business would do best in a given vacant lot. Still further, the analytics server system 35 could be used to match available lots with potential commercial tenants based on the clusters. Also, the analytics server system 35 could be used for marketing in commercial real estate, such as a website that describes the vacant property, forecasts how different types of businesses would perform there, and displays characteristics of the neighborhood (e.g., how far people are coming for certain activities). The analytics server system 35 could also aid in managing portfolios of investment properties, for example by forecasting when to buy or sell a given property in the portfolio.

Yet another application is business analytics. For example, the analytics server system 35 could be used for dynamic forecasting of a business venue's performance. For example, the analytics server system 35 could evaluate, using the determined clusters, how the venue would be impacted by changes in its cluster or nearby clusters. For example, the analytics server system 35 could be used to predict how sales or activity numbers would change in the presence of neighborhood change (e.g., affects on area businesses if a grocery store is added to the neighborhood). Also, the analytics server system 35 could be used to predict sales or activity numbers over time, and/or identify peak (and non-peak) hours, using the clusters.

Political uses are yet another application. The determined clusters could be used for purposes of redistricting, census taking, redrawing neighborhoods, and political campaigns. As to the later, for example, the analytics server system 35 could be used to identify outreach efforts in a political campaign based on the neighborhood clusters.

Yet another application is banking and investment. For example, the analytics server system 35 could be used to determine optimal locations for ATM machines and mobile branches using the clusters. The clusters could also be used, along with a probabilistic model for example, in determining whether or not to give a loan for a given property to a customer.

Other applications include municipal governance and public health and safety. For example, the analytics system 35 could evaluate based on the clusters how a municipality allocates its resources, such as the location of fire stations, police stations, schools, polling stations, bust stops, etc. The clusters could also be used in tracking or investigating the spread of infectious diseases or other epidemiological conditions. Further, in preparation of natural or man-made catastrophes or disasters, the clusters could be used to study the likely location movements of people in the city (e.g., how a localized mass of people are likely to disperse following a large-scale event, such as a sporting event or concert, etc.).

Other applications include national security and surveillance. For example, the analytics system 35 could track or predict how a person or population of interest moves throughout a geographic area(s), using the clusters to improve the accuracy of the predictions and the efficiency of the surveillance. The clusters could also be used to find the most likely points of entry, or points of departure where people are most likely to cross a political border of interest. Further, the clusters could also be used in crime prediction, by segmenting an urban area into places most likely to be areas of high crime, or by predicting patterns in crime before they happen.

Thus, various embodiments of the present invention are directed to computer-based systems and method for discovering (or identifying or producing) synthetic geographic clusters of venues of a geographic region (e.g., a city) based on venue check-in data. In one embodiment that system comprises a computer database system and one or more processors that are in communication with the computer database system. The computer database system stores venue check-in data from multiple venue visitors for multiple venues in the geographic region. The venue visitors could be, for example: persons that use mobile check-in applications to check into venues; persons that make electronic point-of-sale transactions that indicate a person was located at a particular venue at a particular time; persons that indicate a preference for a particular venue through an online venue rating system; and/or persons that indicate a preference for a particular venue through an online venue review system.

The one or more are programmed to (among other things). (i) generate a check-in intensity vector for each of the multiple venues based on the venue check-in data, each check-in intensity vector comprising a plurality of elements, each element corresponding to one or more venue visitors of the multiple venue visitors, and wherein values for the elements of the check-in intensity vector for a venue are based on at least a measure of the intensity of check-ins of the corresponding one or more venue visitors to the venue over a predetermined period of time, (ii) generate a pairwise venue similarity matrix for the multiple venues that comprises a plurality of elements, each element comprising a similarity score indicative of a similarity between a different pair of the multiple venues, wherein the similarity score for a pair of the venues is determined, by the one or more processors, based on at least a measure of the similarity between the check-in intensity vectors for each of the pair of venues; and (iii) identify two or more geographic clusters of venues in the geographic region based on at least the pairwise venue similarity matrix, wherein each of the two or more geographic clusters of venues comprises a mix of one or more venues.

In various implementations, the similarity score for a pair of venues is determined based on both a geographical distance between the pair of the venues and a social distance between the pair of venues. The social distance between a pair of venues may be determined, by the one or more processors, based on whether the pair of the venues is visited by common venue visitors—or common groups of venue visitors—in the check-in data. For example, in various implementations, the similarity score for a pair of venues, venue i and venue j, may be equal to a similarity measure when venue j is one of the m closest venues to venue i, and equal to zero when venue j is not one of the m closest venues to venue i. Or, the similarity measure may be computed based on a cosine similarity between venue i and venue j. Or the similarity measure may be computed based on a Jaccard similarity between venue i and venue j. Or the similarity score for a pair of venues, venue i and venue j, may be equal to a similarity measure when venue j is within a threshold distance r from venue i, and equal to zero when venue j is not within a threshold distance r from venue i. Or the similarity score for a pair of venues, venue i and venue j, may be computed using a decay function that is a function of a distance between venue i and venue j.

In addition, the computer database system may further store venue category data for the multiple venues that indicate a venue category type for the multiple venues. In that case, the mix of venues for each cluster may be further determined, by the one or more processors, based on patterns of venue category type in the venue category data emblematic of a neighborhood type, such that the mix of venues for each cluster is emblematic of a neighborhood type. Alternatively or additionally, the check-in data from the venue visitors may comprise check-in time data, in which case the mix of venues for each cluster is further determined, by the one or more processors, based on patterns of check-in time in the venue check-in data, such that the mix of venues for each cluster is emblematic of one of a predetermined number of temporal check-in pattern types. In such cases, the mix of venues may be determined using inference to compute a probabilistic distribution of venues for each cluster such that the mix of venues for each cluster is emblematic of a neighborhood type and/or temporal check-in pattern. For example, the mix of venues may be determined using statistical sampling, such as Gibbs sampling.

In addition, the two or more geographic clusters of venues in the geographic region that are identified may be compared based on a similarity of distributions of venue visitors that visit the two or more identified geographic clusters.

In yet another embodiment, the geographic region comprises multiple sub-regions, where each of the multiple venue is located in one of the multiple sub-regions, and the computer system is for identifying geographic clusters of sub-regions in the geographic region. In such an embodiment, the processor may generate a check-in intensity vector for each of multiple sub-regions based on the venue check-in data, each check-in intensity vector comprising a plurality of elements, each element corresponding to one or more venue visitors of the multiple venue visitors, and wherein values for the elements of the check-in intensity vector for a sub-region is based on at least a measure of intensity of check-ins of the corresponding one or more venue visitors to venues located in the sub-region over a predetermined period of time. The processor may then generate a pairwise venue similarity matrix for the multiple sub-regions that comprises a plurality of elements, each element comprising a similarity score indicative of a similarity between a different pair of the multiple sub-regions, where the similarity score for a pair of the sub-regions is determined, by the one or more processors, based on at least a measure of the similarity between the check-in intensity vectors for each of the pairs of sub-regions. Finally, the processor may then identify two or more geographic clusters of sub-regions in the geographic region based on at least the pairwise venue similarity matrix, wherein each of the two or more geographic clusters of venues comprises a mix of one or more sub-regions.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, SSDs or hard disk drives. A computer-readable medium may also include memory storage that is physical, virtual, permanent, temporary, semipermanent, and/or semitemporary. A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media. Further, the various databases described herein may be implemented using, for example, disk storage systems and/or in-memory databases, such as the SAP HANA in-memory database system.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm," cloud computing environment, or other grouping of networked servers (such as server blades) that are located and configured for cooperative functions It can be appreciated that a server farm or cloud computing environment may serve to distribute workload between/among individual components of the farm or cloud, as the case may be, and may expedite computing processes by harnessing the collective and cooperative power of multiple servers. Such server farms or clouds may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, a firmware element embedded in hardware, or any combination thereof.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

The invention claimed is:

1. A computer-implemented method comprising:
retrieving, from a database, venue check-in data indicative of a physical presence of venue visitors at a plurality of venues and location data indicative of a geographic location of the venues;
calculating a spatial proximity between pairs of the venues;
determining, based on the venue check-in data, one or more groups of venue visitors that have visited one or more common venues;
calculating a social similarity score between pairs of venues, the social similarity score based, at least in part, on the determination that one or more groups of venue visitors have visited one or more common venues;
calculating an affinity score between the venues in the pairs of venues, the affinity score based on the social similarity score for the pair of venues and the spatial proximity between the venues in the pair; and
identifying a neighborhood cluster of venues based on the affinity scores.

2. The method of claim 1 further comprising:
creating an affinity matrix containing an affinity score between the venues in each pair of venues.

3. The method of claim 1 wherein the affinity score for any pair of venues is 0 if one venue in the pair is not one of them closest venues to the other venue in the pair and is otherwise a function of the social similarity score between the venues in the pair.

4. The method of claim 3 wherein the m closest venues may be determined by factors other than straight-line distance.

5. The method of claim 2 wherein the affinity score for any pair of venues is 0 if one venue in the pair is not within a threshold distance of the other venue in the pair and is otherwise a function of the social similarity score between the venues in the pair.

6. The method of claim 5 wherein the threshold distance may be determined by factors other than straight-line distance.

7. The method of claim 1 further comprising:
creating an undirected graph wherein nodes in the graph represent venues and edges in the graph are weighted by the affinity score for the pair of venues.

8. The method of claim 7 wherein a venue node is only connected to the nodes for its m nearest neighbors or to all nodes within a threshold distance.

9. The method of claim 8 wherein the neighborhood cluster is identified based on the undirected graph.

10. The method of claim 8 wherein the neighborhood cluster is identified using spectral clustering.

11. The method of claim 8 further comprising:
retrieving, from the database, venue category information for each of the venues;
wherein patterns of the venue category information for the plurality of venues are identified, such that a mix of venues selected for inclusion in the neighborhood cluster are emblematic of a certain neighborhood type.

12. The method of claim 1 further comprising:
creating, for each venue, a check-in intensity vector representing the frequency of check-ins from individual venue visitors;
wherein the social similarity score is based on a comparison of the check-in intensity vectors for each venue in the pair of venues.

13. The method of claim 1 wherein the location indicators providing the check-in data are both passive and active indicators.

14. The method of claim 1 wherein the check-in data is algorithmically derived from events including at least a payment event or a venue visitor review event.

15. The method of claim 1 further comprising:
visualizing the neighborhood cluster on a map.

16. The method of claim 1 further comprising:
using the neighborhood cluster as the basis for targeted marketing.

17. The method of claim 1 further comprising:
calculating a neighborhood quality score based on the presence of the neighborhood cluster.

18. The method of claim 1 further comprising:
using venue check-in data to make recommendations for venues in the neighborhood cluster or for additional venues similar to those in the neighborhood cluster.

19. The method of claim 18 wherein the recommendation for venues is visualized on a map.

20. The method of claim 1 further comprising:
using the neighborhood cluster as the basis for urban planning.

21. The method of claim 1 further comprising:
using the neighborhood cluster as a component of real estate or business analytics.

22. The method of claim 1 further comprising:
using the neighborhood cluster as the basis for investment decisions.

23. The method of claim 1 further comprising:
using the neighborhood cluster as the basis for public surveillance and crime prediction.

24. The method of claim 1 wherein the affinity scores between the venues in the pairs of venues are calculated between pairs of venues where one venue of the pair is one of the m closest venues to the other venue in the pair.

25. The method of claim 1 wherein the affinity scores between the venues in the pairs of venues are calculated between pairs of venues where one venue of the pair is within a threshold distance of the other venue in the pair.

* * * * *